United States Patent Office 3,495,011
Patented Feb. 10, 1970

3,495,011
REDUCTION OF BLOOD LEVEL
CHOLESTEROL
Spencer M. Fossel, Bernardsville, N.J., assignor to
Unimed, Inc., Morristown, N.J.
No Drawing. Continuation-in-part of application Ser. No.
646,469, June 16, 1967. This application Oct. 28, 1968,
Ser. No. 771,306
Int. Cl. A61k 27/00
U.S. Cl. 424—312                    5 Claims

ABSTRACT OF THE DISCLOSURE

The present invention relates to the reduction of blood level cholesterol in human beings and animals by administration, preferably orally, of polyglycerols, polyglycerol esters and the like. The compounds of this invention in addition to a high degree of effectiveness are marked by a complete lack of toxicity and lack of undesired side effects.

CROSS REFERENCE TO RELATED APPLICATIONS

This application is a continuation-in-part of my copending application Ser. No. 646,469, filed June 16, 1967, for "Treatment of Constipation and Reduction of Blood Level Cholesterol," which in turn is a division of application Ser. No. 496,170, filed Oct. 14, 1965, for "Treatment of Epilepsy, Glaucoma and Constipation," which in turn is a continuation-in-part of application Ser. No. 405,829, filed Oct. 22, 1964, for "Treatment of Epilepsy and Glaucoma" all now abandoned.

BACKGROUND OF THE INVENTION

The need for effective treatment for the reduction of blood level cholesterol without undesired side effects and with absolute safety from the point of view of toxicity is of course well known. This invention generally relates to such treatment and to the achieving of such results.

SUMMARY OF THE INVENTION

Generally speaking this invention relates to reduction in blood level cholesterol by the administration to a patient, preferably a human being, requiring the same, of a blood cholesterol lowering effective amount of either a polyglycerol or a polyglycerol ester, or a polyethylene glycol wherein the "poly" is at least "tri" and wherein the molecular weight is up to 12,000, or a polypropylene glycol wherein the "poly" is at least "tri" and wherein the molecular weight is up to 12,000.

Although the invention is applicable to the use of either a polyglycerol or a polyglycerol ester or a polyethylene glycol, or a polypropylene glycol, the most preferred substances for the purposes of the invention are the polyglycerols and the polyglycerol esters.

The use of the polyglycerols and polyglycerol esters for the purposes of the present invention provide numerous advantages. Aside from the advantages in effectivity, which will be further discussed below, one of the primary advantages of these compounds is that the body is able to utilize the polyglycerols and polyglycerol esters just like common fats and oils so that there is no accumulation or toxic effect whatsoever even upon extensive and high dosage use of these substances. As a matter of fact, these substances are so safe that the Food and Drug Administration has approved use of these substances in foods.

I have discovered, however, that these substances, in addition to the safety which perimts their use as and in foods, have marked effectiveness for reducing blood level cholesterol.

An advantage of the present invention is that it is possible by adjusting the degree of esterification of the polyglycerols to adjust the speed of the relief in the body so that it is possible to provide either quick acting compositions, slow acting compositions, or compositions which both act quickly and over a prolonged period of time.

It is possible in accordance with the present invention to use the polyglycerols and polyglycerol esters and other substances for the purpose of reducing blood level cholesterol. These substances provide effective reduction of blood level cholesterol.

While glycerin itself might have some suitability for such uses, the compounds of the present invention provide several advantages, in addition to greater effectiveness, over glycerin. One of the advantages is that glycerin cannot be taken as freely as the polyglycerols and polyglycerol esters of the present invention, because prolonged and extensive administration of glycerin can cause gastric and other upsets. Furthermore, glycerin is highly unpalatable and is difficult to take in concentrated form. The polyglycerols and polyglycerol esters of the present invention, on the other hand, can easily be taken in concentrated form. In fact, those polyglycerols and polyglycerol esters can be taken in the form of capsules for the viscous liquid polyglycerols and polyglycerol esters, and in capsule or tablet form for the solid, powdered polyglycerols and polyglycerol esters.

Among the most suitable polyglycerols and polyglycerol esters for purposes of the present invention are:

Triglycerol
Hexaglycerol
Decaglycerol
Triglycerol monostearate
Triglycerol monooleate
Hexaglycerol monostearate
Hexaglycerol monooleate
Hexaglycerol dioleate
Hexaglycerol hexaoleate
Decaglycerol monostearate
Decaglycerol monooleate
Decaglycerol monolaurate
Decaglycerol tristearate
Decaglycerol trioleate
Decaglycerol trilinoleate
Decaglycerol decasterate
Decaglycerol decaoleate
Dacaglycerol decalinoleate
Triglycerol mono shortening ("Drewpol 3–1–SH")
Hexaglycerol mono shortening ("Drewpol 6–1–SH")
Hexaglycerol di shortening ("Drewpol 6–2-SH")
Decaglycerol mono shortening
    ("Drewpol 10–1–SH")
Decaglycerol tri shortening
    ("Drewpol 10–3–SH")
Diglycerol
Tetraglycerol
Pentaglycerol
Hexaglycerol
Heptaglycerol
Octaglycerol
Monaglycerol
Pentaglycerol monostearate
Triglycerol mono cottonseed
Pentaglycerol mono cottonseed
Triglycerol mono hydrogenated cottonseed
Pentaglycerol mono hydrogenated cottonseed The preferred glycerols and glycerol esters for the purpose of the present invention are triglycerol, decaglycerol, hexaglycerol, triglycerol monostearate, hexaglycerol distearate, decaglycerol tetraoleate, and decaglycerol tristearate. The most preferred substances are decaglycerol, decaglycerol monopalmitate and decaglycerol tetralinoleate.

It can be seen, however, from the above list, that the invention is applicable to all of the polyglycerols and particularly the polyglycerols from diglycerol to decaglycerol and partial and complete esters thereof with $C_2$ to $C_{24}$ fatty acids which are either saturated, monounsaturated or poly-unsaturated.

The dosage of the polyglycerols and polyglycerol esters of the present invention in reduction of blood level cholesterol will vary depending upon the molecular weight of the particular polyglycerol or polyglycerol esters as well as upon the number of hydroxyl groups thereof. A typical dosage is about 20–50 grams, which can be administered three to four times a day. Higher amounts can also be administered. As mentioned above, the advantage of polyglycerols and polyglycerol esters of the present invention is their complete lack of toxicity.

The lower glycols such as ethylene glycol and diethylene glycol are readily metabolized to or readily contribute to undesired concentrations of oxalate ions, and therefore, these substances have not found acceptance for human consumption. However, the triethylene glycol and higher ethylene glycols act similarly to the polyglycerols and can be suitably used for the purposes of the present invention.

As a practical matter, the polyethylene glycols, and likewise the polypropylene glycols should not be used beyond a molecular weight of about 12,000. This higher molecular weight limitation is mainly a practical limitation because the higher polymers tend to become less and less water soluble or easily dispersible in physiological fluids.

The compounds of the invention are useful for the purposes of the invention whereas ordinary dietary proteins do not produce these beneficial effects. These ordinary dietary proteins include caseine and albumen, and the same are readily hydrolyzed to amino acids by proteolytic enzymes. On the other hand, the compounds of the invention are not metabolized readily by the body, they have a low antigenicity and are readily usable for the purposes of this invention.

DESCRIPTION OF PREFERRED EMBODIMENTS

The following examples are given to further illustrate the invention. The scope of the invention is not, however, meant to be limited to the specific details of these examples.

EXAMPLE 1

Large gelatin capsules are filled with 5 grams each of decaglycerol. In the reduction of blood cholesterol level, 2–4 capsules are administered 3–4 times a day.

EXAMPLE 2

Gelatin capsules are filled with 5 grams each of decaglycerol monopalmitate. These capsules are used as in Example 1 for the reduction of blood level cholesterol.

EXAMPLE 3

Large size gelatin capsules are filled with 10 grams each of decaglycerol trilinoleate. These capsules are administered in the form of 2–4 capsules, 3–4 times a day, for the purpose of reducing blood cholesterol concentration.

EXAMPLE 4

Large gelatin capsules are filled with 5 grams each of triethylene glycol. These capsules can be administered as 2 capsules, three times a day, for the reduction of blood level cholesterol.

EXAMPLE 5

Gelatin capsules are filled with 5 grams each of decapropylene glycol. These capsules are administered 2 capsules, three times a day, for reduction of blood level cholesterol.

While the invention has been described in particular with respect to the reduction of blood level cholesterol by the use of certain polyglycerols, polyglycerol esters and similar compounds, it is to be understood that variations and modifications of the invention can be made without departing from the spirit or scope thereof.

I claim:
1. Method of reducing blood level cholesterol which comprises orally administering to a patient requiring such treatment a blood level cholesterol lowering effective amount of a substance selected from the group consisting of polyglycerols from diglycerol to decaglycerol, and fatty esters thereof with $C_2$ to $C_{24}$ fatty acids.
2. Method according to claim 1 wherein said substance is decaglycerol.
3. Method according to claim 1 wherein said substance is decaglycerol monopalmitate.
4. Method according to claim 1 wherein said substance is decaglycerol trilinoleate.
5. Method according to claim 1 wherein said substance is administered orally in a dosage of about 20–50 grams, three to four times a day.

References Cited

UNITED STATES PATENTS

| | | | |
|---|---|---|---|
| 2,024,356 | 12/1935 | Harris | 99—118 |
| 2,132,417 | 10/1938 | Harris | 99—123 |

ALBERT T. MEYERS, Primary Examiner

F. D. GOLDBERG, Assistant Examiner

U.S. Cl. X.R.

424—343